(No Model.)
F. J. SPRAGUE.
ELECTRO DYNAMIC MOTOR.
No. 323,460. Patented Aug. 4, 1885.
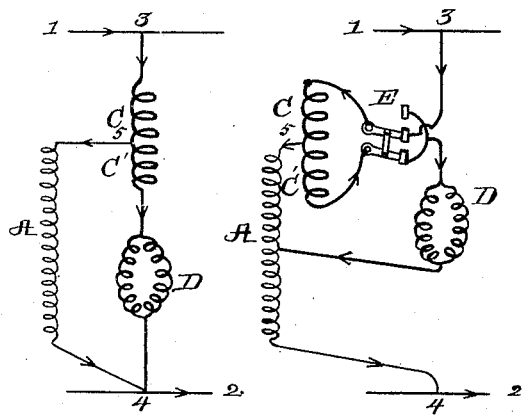
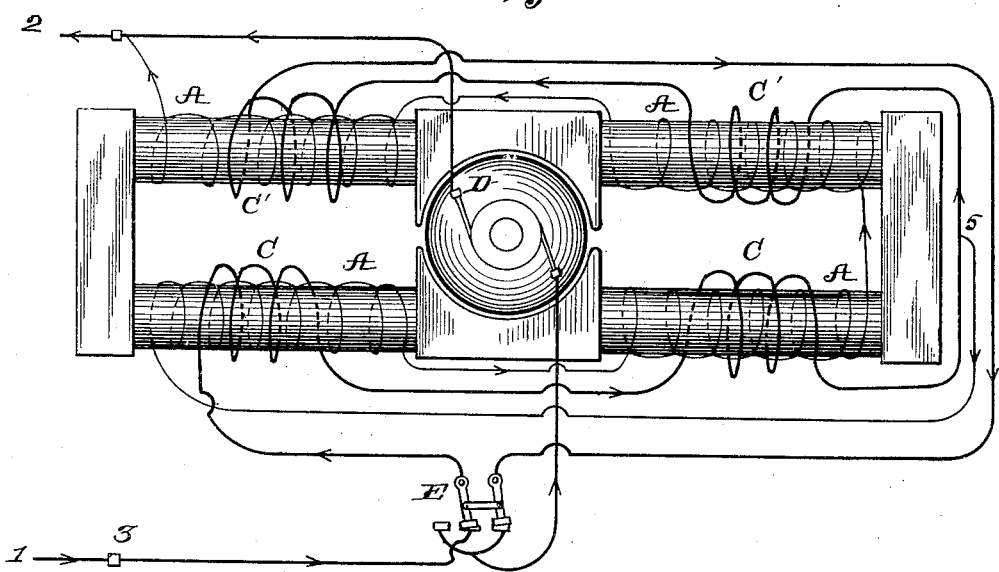
ATTEST
E. Rowland
L. W. Kiddle
INVENTOR:
Frank J. Sprague
By Dyer & Seely
Attys

UNITED STATES PATENT OFFICE.

FRANK J. SPRAGUE, OF NEW YORK, N. Y., ASSIGNOR TO THE SPRAGUE ELECTRIC RAILWAY AND MOTOR COMPANY.

ELECTRO-DYNAMIC MOTOR.

SPECIFICATION forming part of Letters Patent No. 323,460, dated August 4, 1885.

Application filed March 12, 1885. (No model.)

*To all whom it may concern:*

Be it known that I, FRANK J. SPRAGUE, of New York, in the county and State of New York, have invented a certain new and useful Improvement in Electro-Dynamic Motors, of which the following is a specification.

My invention relates to differential electro-dynamic motors—that is to say, to those having main field-coils in shunt relation to the armature and differential field-coils in series with the armature.

Heretofore such motors have been arranged in either of two ways—first, with the differential coil inside the terminals of the armature and main field-shunts, and, second, with the differential coil outside said terminals. I have devised another arrangement, which I have found convenient in many cases, which consists in the employment of two sets of differential field-coils, with the main field-coils shunted upon only one of said differential sets—that is, one set being inside and the other outside the terminals of the armature and main field-shunts. The operation of this arrangement will be presently explained. In connection with this arrangement I prefer to employ means for modifying the action of one or both of the series sets, as set forth in my application Serial No. 138,146. I may employ, also, means for varying the potential at the armature-circuit terminals.

My invention is illustrated in the accompanying drawings, in which Figure 1 is a diagram of the circuits of a motor embodying said invention; Fig. 2, a diagram of the same, with a switch for the differential coils; Fig. 3, a diagram of the same, with movable armature-circuit terminals; and Fig. 4, a view of a motor wound according to my invention.

1 2 are line-conductors, from which the motor derives current. 3 4 are the motor-circuit terminals. A are the main or regular field-magnet coils. C and C' are the two sets of differential field-magnet coils. 5 is the point of junction of the shunt-coil to the two sets of series coils. D is the armature. It will be seen that both differential sets are in series with the armature, while the main field-coils are in shunt relation to the armature and the differential coils C'.

The operation of this arrangement is as follows: If there is no load on the motor, and hence, practically, no armature-current, there is no current in coils C', while the current in coils C is only that of coils A, so that the differential effect is very small; but if load is placed on the motor, decreasing the speed slightly, the counter electro-motive force being thus decreased, current passes in coils C', and the differential effect of these coils is brought into play, while at the same time the current of coils C is augmented to the same extent, and their differential effect thereby increased; also, the drop in potential between 3 and 5 causes a decreased current in coils A, which still further tends to weaken the field. Thus the speed is again brought up to the normal.

I prefer to proportion the two differential coils relatively to the main field-coils in the same way as is set forth in the application already referred to—that is, so that a zero field, or nearly so, is produced if circuit is closed to both the differential coils and the main or shunted coils when the motor is at rest. In this case it is necessary to employ, in starting the motor, means for modifying the magnetizing effect of the series coil. For this purpose I prefer to employ a short-circuiting and reversing switch, E, for said series coils. The circuit of such coils is thus reversed when the motor is started, so that such coils have then a cumulative action, and the motor starts slowly. The coils are then short-circuited, and finally placed directly in circuit, so as to have their usual differential function.

The switch may evidently be made to affect only one of the differential sets, with the same effect. The same effect, with the additional effect of varying the armature-current, is produced by shifting one or both of the armature shunt-terminals upon the main field-coils, so as to vary the difference of potential between such terminals, as shown in Fig. 3. For this purpose the field-coils are wound sectionally, and a suitable commutator is employed, as will be readily understood.

The motor shown in Fig. 4 is one in which field-magnet cores extend in different directions from the same pole-pieces. It is evident, however, that my invention is applicable as well to any other form of field-magnets. The main field-coils A are wound on all the legs of the magnet, and the differential coils C are wound in two legs, and C' on the other two.

The arrow-heads in the drawings show the direction of current.

What I claim is—

The combination, in an electro-dynamic motor, of main field-coils in shunt relation to the armature, differential field-coils in series with the armature and inside the terminals of the armature and main field-shunts, and differential field-coils in series with the armature and outside the terminals of the armature and main field-shunts, substantially as set forth.

This specification signed and witnessed this 16th day of February, 1885.

FRANK J. SPRAGUE.

Witnesses:
  A. W. KIDDLE,
  E. C. ROWLAND.